United States Patent
Seif et al.

(10) Patent No.: US 6,767,118 B2
(45) Date of Patent: Jul. 27, 2004

(54) DEVICE AND METHOD FOR ADJUSTING THE DIRECTION OF LIGHT EMITTED FROM A MOTOR VEHICLE HEADLIGHT

(75) Inventors: Lothar Seif, Reutlingen (DE); Ulrich Neubauer, Weilheim/Teck (DE); Ernst-Olaf Rosenhahn, Bodelshausen (DE); Gustav Klett, Dusslingen (DE)

(73) Assignee: Automotive Lighting Reutlingen GmbH, Reutlingen (DE)

( * ) Notice: Subject to any disclaimer, the term of this patent is extended or adjusted under 35 U.S.C. 154(b) by 0 days.

(21) Appl. No.: 10/315,879

(22) Filed: Dec. 10, 2002

(65) Prior Publication Data

US 2003/0133309 A1 Jul. 17, 2003

(30) Foreign Application Priority Data

Dec. 13, 2001 (DE) .......................................... 101 61 259
Feb. 8, 2002 (DE) .......................................... 102 05 215

(51) Int. Cl.$^7$ .......................... B60Q 1/08; F21V 21/30
(52) U.S. Cl. ........................ 362/464; 362/37; 362/272; 362/286; 362/428
(58) Field of Search .................................. 362/464, 465, 362/466, 37, 39, 43, 44, 272, 286, 419, 428

(56) References Cited

U.S. PATENT DOCUMENTS

| | | | | | |
|---|---|---|---|---|---|
| 3,731,079 | A | * | 5/1973 | Porsche | 362/527 |
| 4,237,529 | A | * | 12/1980 | Mutschler et al. | 362/526 |
| 4,574,334 | A | * | 3/1986 | Igura | 362/515 |
| 4,733,333 | A | * | 3/1988 | Shibata et al. | 362/40 |
| 2002/0057572 | A1 | * | 5/2002 | Kondo et al. | 362/460 |

* cited by examiner

*Primary Examiner*—Alan Cariaso
*Assistant Examiner*—Mark Tsidulko
(74) *Attorney, Agent, or Firm*—Michael J. Striker

(57) ABSTRACT

A device for adjusting a light emission direction of a motor vehicle headlight has a unit for executing a pivoting movement of at least one part of the motor vehicle headlight that is held by a suspension and which effects the light emission direction, about an axis of rotation that is approximately parallel to a vertical axis of the motor vehicle, the unit for executing the pivotal movement having at least one electric motor selected from the group consisting of a direct current motor and an alternating current motor.

8 Claims, 2 Drawing Sheets

DEVICE AND METHOD FOR ADJUSTING THE DIRECTION OF LIGHT EMITTED FROM A MOTOR VEHICLE HEADLIGHT

BACKGROUND OF THE INVENTION

The present invention relates to a device for adjusting the direction of light emitted from a motor vehicle headlight. In this connection, a pivoting movement of at least one part of the motor vehicle headlight affected by the light emission direction, held with the assistance of a suspension, is executable about a rotational axis that is approximately parallel to a vertical axis of the motor vehicle.

In addition, the present invention relates to a motor vehicle headlight with an adjustment device for swiveling or pivoting of the light emission direction of the headlight.

Furthermore, the present invention relates to a method for adjusting the light emission direction of a motor vehicle headlight by means of an adjusting device. In this connection, a pivoting movement of at least one part of the motor vehicle headlight affected by the light emission direction, with the assistance of a suspension, is executable about a rotational axis that is approximately parallel to a vertical axis of the motor vehicle.

In addition, the present invention relates to a computer program for a control apparatus of an adjustment device of a motor vehicle headlight. The computer program is performable on a computer, in particular, a microprocessor, of the control apparatus.

Finally, the present invention relates to a control apparatus for an adjustment device of a motor vehicle headlight, whereby the control unit has a computer, in particular, a microprocessor, and an electrical storage medium, on which a computer program run on the computer is stored.

Adjustment devices of the above-described type are known from the state of the art and are used to adapt the light emission direction of a motor vehicle headlight to the radius of a traversing curve, in order to achieve an optimal illumination of the roadway, in particular, also in curves with a small curve radius. In this connection, a mechanical coupling of the adjustment device with a component of the steering mechanism of the motor vehicle, for example, directly with the steering wheel of the vehicle, is provided. The mechanical coupling is formed, for example, as a Bowden wire.

The mechanical coupling operates a pivoting movement of the motor vehicle headlight about a rotational axis that is approximately parallel to a vertical axis of the vehicle, whereby the angle, about which the vehicle headlight is pivoted, is dependent on the steering wheel stop, and therewith, the steering angle. Only determined parts of the headlight that affect the light emission direction (for example, the reflector, the light source, the imaging or focusing optics, etc.) can be pivoted, or the entire headlight (including the housing and the cover plate) can be pivoted in the structural opening of the vehicle body.

This type of adjustment of the beam direction of a vehicle headlight with the goal of improved illumination of a curve being traversed is also designated as curve illumination. The disadvantages of curve illumination systems are based on the lack of flexibility of the mechanical coupling between the steering wheel and the adjustment device. Neither existing degrees of freedom with the mechanical positioning of the beam direction, such as, for example, a speed-dependent transmission between the steering angle and the beam direction of the headlight, in consideration of special driving dynamic conditions, in particular, in limiting regions of the vehicle, nor a simple applicability of the curve illumination system is assured. For different vehicle models and resulting different structural situations in the engine chamber, respective expensive adaptations, such as, for example, a particular length and guide of the Bowden wire, are necessary. A diagnosis of the affected mechanics is only possible by means of an expensive inspection of the relevant components.

The present invention addresses the problem of producing a possibility of making the adjustment of a motor vehicle headlight more flexible. In particular, an adjustment device should have a better adaptability to various motor vehicles as well as a better diagnostic ability and system expandability while simultaneously having a smaller structural size.

SUMMARY OF THE INVENTION

Departing from the adjustment device of the above-described type, the present invention proposes that the device for executing the pivoting movement has at least one electric motor, in particular, a direct current motor or an alternating current motor.

By using electric motors for pivoting of the light emission direction of the motor vehicle headlight, a mechanical coupling between the steering wheel or other parts of the steering system of the vehicle and the adjustment device can be eliminated. The electric motor can be directly arranged in the vehicle headlight and therefore requires no structural space outside of the headlight housing. A further advantage exists in the improved adaptability of the inventive adjustment device, in that the vehicle type-specific parts, namely, the Bowden wires, are eliminated. A control of the electric motor can take place by means of control lines, which can be integrated in an already-provided laced wiring harness for supplying the motor vehicle headlight. Alternatively, the control can also take place via bus systems that are likewise provided in the vehicle.

The part of the vehicle headlight that can be pivoted from the drive means can comprise an entire light module, that is, a unit having a light source and lens and/or reflector. However, it is also possible only to pivot a light source held in the suspension relative to a reflector fixedly mounted in the headlight. Likewise, the light source can be fixedly connected to the headlight and a reflector supported in the suspension or mounting is pivoted relative to the light source.

A preferred embodiment of the invention contemplates that, additionally, a further pivoting movement of at least the part of the vehicle headlight about a further axis of rotational that is approximately parallel to a horizontal axis of the vehicle is executable, and that the device includes drive mans for executing the further pivoting movement. The basic advantage of this embodiment is that with an inventive adjustment device, a curve illumination system and a system for regulating the light width of the vehicle headlight simultaneously is made available.

Advantageously, the drive means for the further pivoting movement likewise is an electric motor, in particular, a direct current motor or an alternating current motor.

It is also possible that the electric motor and/or the drive means are formed as a stepping motor. In addition, it is also possible that the drive means includes pneumatic and/or hydraulic adjustment devices.

Another embodiment of the adjustment device of the present invention is characterized in that the suspension includes a Cardanic suspension, which has two, respectively rotatably supported frames, whose axes of rotation stand approximately perpendicular on one another, whereby the first frame is suspended on the vehicle headlight and the second frame is suspended on the first frame. Preferably, the second frame is suspended within the first frame. With this embodiment, an electric motor or drive means is associated with a respective one of the frames.

If the driving means, as already proposed, are electric motors, then it is possible to attach the electric motor for pivoting the first, outer frame in the headlight housing and to attach the electric motor for pivoting the second, inner frame within the first, outer frame.

A particularly advantageous embodiment of the invention is characterized in that the suspension includes a frame and a ball-and-socket joint, with which the frame in the vehicle headlight is suspended. The ball-and-socket joint requires particularly minimal structural space and permits simultaneously a pivoting of the frame attached therein about two axes of rotation.

As a further solution of the problem addressed by the present invention, in contrast to the methods of the above-described type, it is proposed that the pivoting movement is performed by means of an electric motor in dependence on the radius of a traversing curve.

According to an advantageous further embodiment of the present invention, it is proposed that, additionally, a further pivoting movement of at least the part of the headlight about a further axis of rotational that is approximately parallel to a horizontal axis of the vehicle is executed, and that the further pivoting movement is performed by means of a drive means.

A preferred embodiment of the present invention contemplates that the determination of the curve radius is performed by means of evaluating turning angle sensor signals, wheel speed signals, yaw rate sensor signals or acceleration sensor signals, satellite or other navigation data or with the assistance of a combination of the above. Advantageously, the necessary running of electronic control apparatus is performed for determination of the curve radius, control signals for the electric motor and the drive mans are determined from the electronic control apparatus in dependent on the determined curve radius and the electric motor and the drive means are loaded by the electronic control apparatus with these control signals.

A combination of the previously noted sensor signals or data for determining the curve radius of the traversing curve contributes to the accurate determination of the actual driving situation and therefore maintains therewith an accurate value for the curve radius.

Likewise, it is also contemplated that the electronic control apparatus used a previously determined curve radius from another electronic control apparatus for calculating control signals for the electric motor or the drive means.

Of particular significance is the realization of the inventive method in the form of a computer program, which is provided for a control apparatus of an adjustment device of a vehicle headlight. In this connection, the computer program is adapted to be run on a computer, in particular, on a microprocessor and is suited for executing the inventive method. In this case, then, the invention is realized through the computer program, so that this computer program illustrates the invention in the same manner as the method, to which execution of the computer program is suited. The computer program also can be saved on an electronic storage medium, for example, on a flash memory or on a read-only memory.

As yet a further solution for the problem addressed by the present invention, a control apparatus for an adjustment device of a vehicle headlight is proposed, which is suitable for performing the method of the present invention. For executing the inventive method, preferably the computer program stored on the electric storage medium runs on the computer of the control apparatus.

DETAILED DESCRIPTION OF THE PREFERRED EMBODIMENTS

Figure 1:
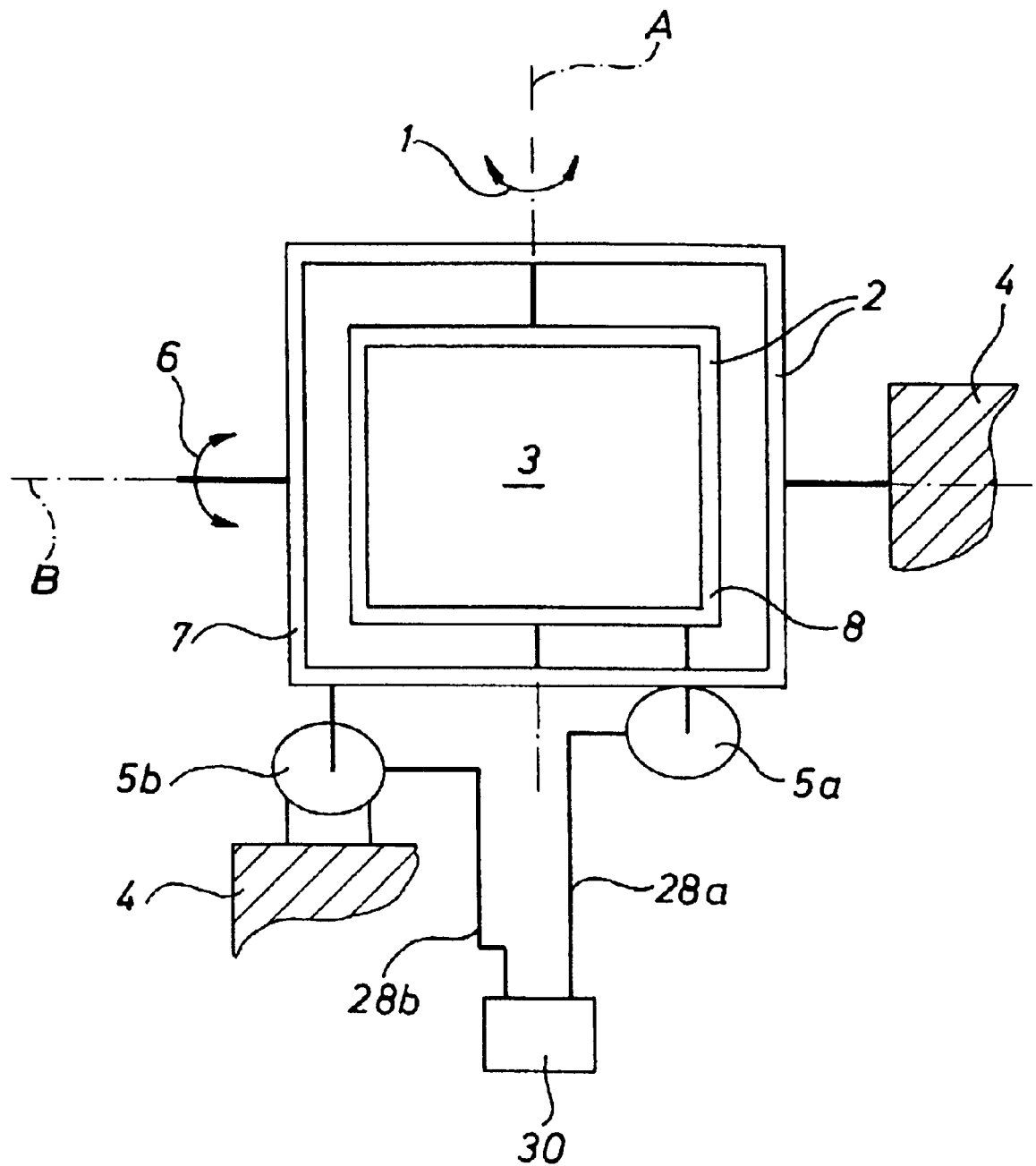
FIG. 1 shows schematically a first embodiment of the adjustment device of the present invention.
Figure 2:
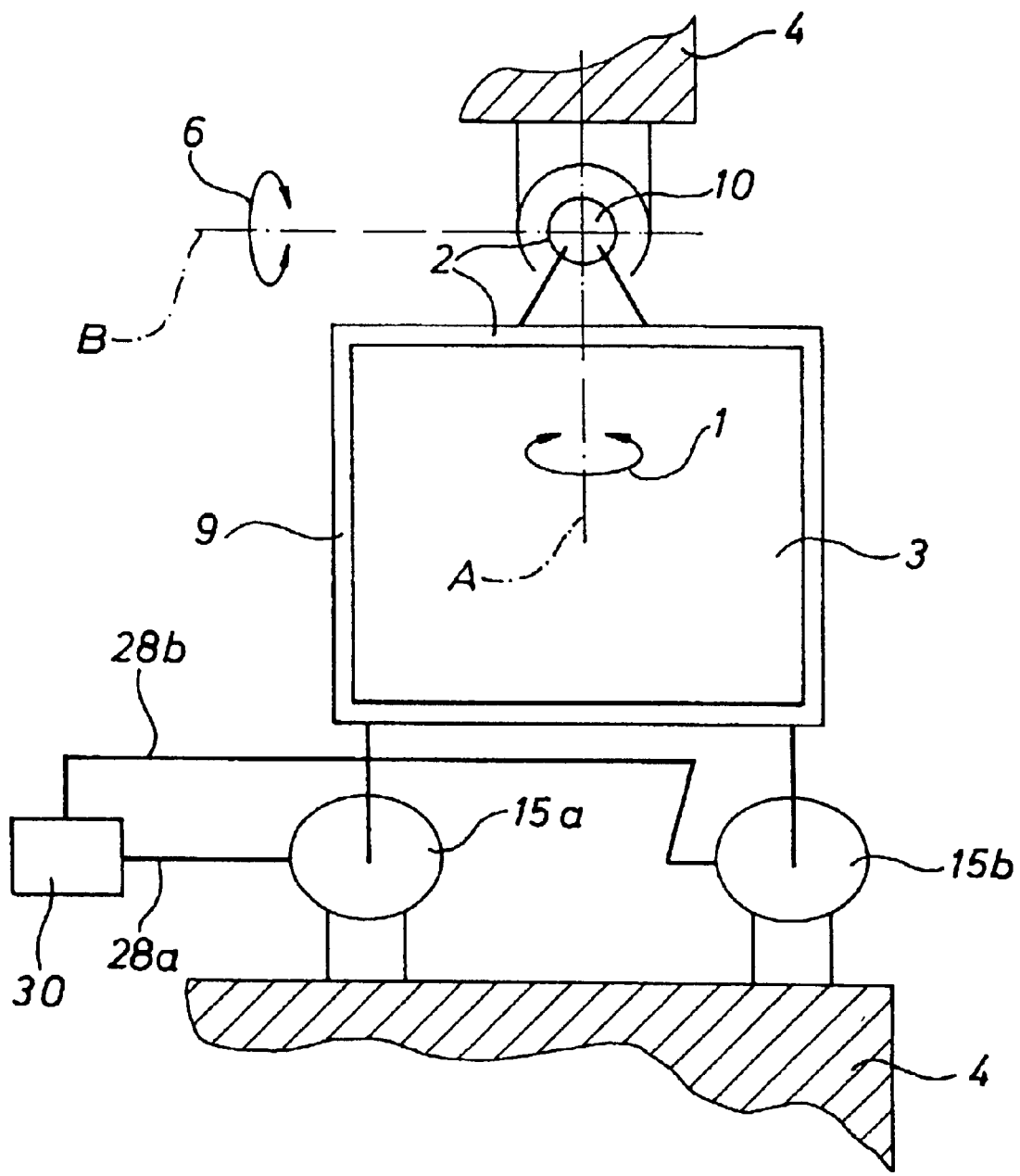
FIG. 2 shows schematically a second embodiment of the adjustment device of the present invention.

Adjustment device for a vehicle headlight 4 according to the present invention are illustrated in FIGS. 1 and 2. The devices serve for adjusting the light emission direction of the vehicle headlight 4.

The embodiment of the adjustment device of the present invention illustrated in FIG. 1 has a Cardanic suspension 2, which includes a first, outer frame 7 as well as a second, inner frame 8. The frames 7, 8 are each rotatably supported, whereby the frame 7 is rotatable about an axis of rotation B and the frame 8 is rotatable about an axis of rotation A.

The frame 7 is associated with a first electric motor 5b and the frame 8 is associated with a second electric motor 5a. Both electric motors 5a, 5b are connected via control lines 28a, 28b to a control apparatus 30. The first electric motor 5b is attached in a housing of the headlight 4; likewise, the axis of rotation B is arranged in the headlight housing.

With the adjustment device shown in FIG. 1, a pivoting of the part 3 of the headlight 4 affecting the light emission direction of the headlight 4 about the axis of rotation A and B is possible. The respective rotational movements are symbolized by the double arrows 1, 6 associated with the axes of rotation A, B.

The axis of rotation A runs approximately parallel to a vertical axis of the vehicle, and the axis of rotation B is directed approximately parallel to a horizontal axis of the vehicle. In this manner, an illumination on curves-function can be realized with an adjustment device by means of the pivoting movement 1, and by means of the pivoting movement 6, an adjustment of the illumination width of the vehicle headlight 4 can be realized.

The pivoting movement 1 is caused, in that the control apparatus 30 controls the electric motor 5a via the control lines 28a. Analogously thereto, the pivoting movement 6 is caused, in that the control apparatus 30 controls the electric motor 5b via the control lines 28b.

The part 3 of the motor vehicle headlight, which is pivoted from the electric motors 5a, 5b, can comprise an entire light module, that is, a unit made up of a light source and reflector and/or lens. It is also possible, however, only to pivot a light source held in the suspension 2 relative to a reflector fixedly mounted in the headlight housing 4. Likewise, the light source can be fixedly connected with the headlight housing 4, and a reflector supported in the suspension 2 or a lens is pivoted relative to the light source.

The control of the electric motors 5a, 5b can take place individually, that is, only the electric motor 5a is controlled, which adjusts the curve illumination, or only the electric motor 5b is controlled, which adjusts the illumination width of the headlight. In addition, the control of the electric motors 5a, 5b, however, also can take place simultaneously, in order to adjust the curve illumination at the same time as the illumination width.

FIG. 2 shows a second embodiment of the adjustment device of the present invention, which has a particularly space-saving suspension 2, which comprises a ball-and-socket joint 10 and a frame 9, which is connected via the ball-and-socket joint 10 with the housing of the headlight 4.

On the lower edge of the frame 9, electric motors 15a, 15b are mounted in respective opposite corners of the frame 9. They are connected with the headlight housing and effect pivoting movements 1, 6 of the frame 9 about the axes of rotation A, B, in which they are loaded via control lines 28a, 28b from control apparatus 30 with control signals.

In contrast to the Cardanic suspension of FIG. 1, the actions of force of the electric motors 15a, 15b are not directed such that a control only of one of the electric motors 15a, 15b effects either only an adjustment of curve illumination or an adjustment of illumination width. In order to stop only one of these two adjustment functions, the control apparatus 30 must control both electric motors 15a, 15b simultaneously according to a calculated standard or sample or according to a standard or sample input in a valuation table in the memory of the control apparatus 30.

With this principle, only one frame 9 is required, and multiple bearings are not needed fundamentally. For example, the motor-coupling of the electric motors 15a, 15b already takes over the application of the frame 9.

Also, stepping motors can be used as drive means. In addition, the use of pneumatic or hydraulic or electromagnetic adjustment devices is contemplated. It is very advantageous with all of these drive means it they are arranged within the headlight housing 4. In this manner, no additional structural volume in the engine chamber of the vehicle is required.

In the event of an electrical drive means, an energy supply is possible very simply by means of already-provided laced wiring harness for supplying the headlight. In the invent the control apparatus 30 is not directly mounted in the headlight, the control lines 28a and 28b likewise can be guided in a previously provided laced wiring harness to the drive means.

It is also contemplated that the control signals for the drive mans 5a, 5b, 15a, 15b can be transmitted via a bus system, such as, for example, a CAN-bus, from the control apparatus 30 to the drive means 5a, 5b, 15a, 15b, and the drive means 5a, 5b, 15a, 15b can be equipped with their own sending and receiving means for the CAN communication.

As an input variable for the adjustment of the curve illumination, the radius of a curve being traversed is used, which first is to be determined by the control apparatus 30. This can take place with the assistance of a steering angle sensor signal, by means of evaluation of the speed signals of multiple vehicle wheels, with the help of a yaw rate of the vehicle, or also the horizontal speed of the vehicle. It can also be very advantageous if satellite-supported navigation data or navigation data stored on digitalized maps are used for determining the radius of the curve being traversed. A combination of the above-noted means is particularly safe, since in this case, the possibility of plausibility and control calculations is provided.

It is further contemplated that the control apparatus 30 contains already-determined and/or prepared values of the radius of the curve being traversed from other control apparatus of the vehicle, such as, for example, from control apparatus fro regulating the brake system or the driving dynamics, whereby the communication of the control apparatus can take place via a CAN bus or the like.

The simple applicability of the above-described adjustment device to various vehicle types is ensured, since all components of the adjustment device are either directly mounted in or on vehicle specific headlights, preferably within the headlight housing, or likewise are connectable via a vehicle-specific laced wiring harness.

A diagnosis of the adjustment device takes place via the control apparatus, which has an error storage, which, for example, is readable upon maintenance of the vehicle.

It will be understood that each of the elements described above, or two or more together, may also find a useful application in other types of constructions differing from the types described above.

While the invention has been illustrated and described herein as device and method for adjusting the light emission direction of a motor vehicle headlight, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A device for adjusting a light emission direction of a motor vehicle headlight, comprising means for executing a pivoting movement of at least one part of the motor vehicle headlight that is held by a suspension and which effects the light emission direction, about an axis of rotation that is approximately parallel to a vertical axis of a motor vehicle, the means for executing the pivotal movement having at least one electric motor selected from the group consisting of a direct current motor and an alternating current motor, wherein the suspension is a Cardanic suspension which includes two rotatably supported frames having axes of rotation which extend approximately parallel to one another, the frames including a first frame suspended on the motor vehicle and a second frame suspended within the first frame.

2. A device as defined in claim 1; and further comprising drive means for performing a further pivoting movement of the at least one part of the motor vehicle headlight, about a further axes of rotation that is approximately parallel to a horizontal axis of the vehicle.

3. A device as defined in claim 2, wherein at least one of the electric motor and the drive means is a stepping motor.

4. A device as defined in claim 2, wherein the drive means include an adjustment device selected from the group consisting of a pneumatic device, a hydraulic device, and an electromagnetic device.

5. A device according to claim 1, wherein the pivotal movement about the axis of rotation that is approximately parallel to a vertical axis of the motor vehicle is performed as a function of a radius of an executed curve.

6. A device according to claim 5, wherein determination of the curve radius takes place by evaluation of a parameter selected from the group consisting of steering angle sensor signals, tire speed signals, yaw sensor signals, acceleration sensor signals, satellite data, other navigation data and a combination thereof.

7. A device according to claim 6, wherein the device includes an electronic control apparatus for determination of the curve radius, wherein the electronic control apparatus detects control signals from the electric motor and the drive means as a function of the determined curve radius, and wherein the electronic control apparatus impinges the electric motor and the drive means with the control signals.

8. A motor vehicle headlight with an adjustment device for pivoting a light emission direction of the motor vehicle headlight, wherein the adjustment device is formed according to claim 1.

* * * * *

UNITED STATES PATENT AND TRADEMARK OFFICE
CERTIFICATE OF CORRECTION

PATENT NO.         : 6,767,118 B2
APPLICATION NO. : 10/315879
DATED                : July 27, 2004
INVENTOR(S)      : Seif et al.

It is certified that error appears in the above-identified patent and that said Letters Patent is hereby corrected as shown below:

Column 6, Line 32 Delete "parallel" and substitute "perpendicular"

Signed and Sealed this

Twelfth Day of January, 2010

David J. Kappos
*Director of the United States Patent and Trademark Office*